United States Patent
Trujillo (10) Patent No.: US 9,587,775 B2
(45) Date of Patent: Mar. 7, 2017

(54) FLANGE ALIGNMENT TOOL

(71) Applicant: Alan J Trujillo, Sheridan, WY (US)

(72) Inventor: Alan J Trujillo, Sheridan, WY (US)

(73) Assignee: TRUCE NED TRUJILLO, Spearfish, SD (US)

( * ) Notice: Subject to any disclaimer, the term of this patent is extended or adjusted under 35 U.S.C. 154(b) by 0 days.

(21) Appl. No.: 14/734,005

(22) Filed: Jun. 9, 2015

(65) Prior Publication Data

US 2016/0363245 A1    Dec. 15, 2016

(51) Int. Cl.
*F16B 2/24*    (2006.01)
*F16L 23/00*    (2006.01)

(52) U.S. Cl.
CPC ............ *F16L 23/003* (2013.01); *F16B 2/248* (2013.01); *Y10T 24/1476* (2015.01); *Y10T 24/44667* (2015.01); *Y10T 24/44778* (2015.01); *Y10T 24/44957* (2015.01)

(58) Field of Classification Search
CPC .... F16B 2/248; F16B 2/10; F16B 2/20; F16L 23/003; Y10T 24/1476; Y10T 24/44667; Y10T 24/44778; Y10T 24/44957

USPC ........... 24/26, 27, 40, 67 P, 567, 546, 714.2, 24/714.9, 708.8, 709.7, 709.8, 710, 2, 1, 24/108, 598.6, 598.5; 63/14.5; 132/276–279, 284
See application file for complete search history.

(56) References Cited

U.S. PATENT DOCUMENTS

| | | | | |
|---|---|---|---|---|
| 1,433,678 A | * | 10/1922 | Ehlich ...................... | A44B 9/18 24/709.7 |
| 1,797,523 A | * | 3/1931 | Dippel ..................... | A44B 9/18 24/709.7 |
| 4,616,113 A | * | 10/1986 | Jank .................... | G08B 13/1463 200/61.13 |

* cited by examiner

*Primary Examiner* — Abigail Morrell (57) ABSTRACT

A flange alignment tool is used to align a flange to a pipe before welding. The flange alignment tool includes an inelastic ball which may be clipped over a hole of a flange to secure the flange alignment tool to the flange. The flange alignment tool includes a ring which is clips over the other end of a flange hole. A torsion spring is connected between the inelastic ball and the ring and applies the force necessary to secure the flange alignment tool to a flange. The inelastic ball is mounted to a first load leg of the torsion spring and the ring is mounted to a second load leg of the torsion spring. The torsion spring allows the flange alignment tool to flex about a rotation axis of the torsion spring. When the flange alignment tool is flexed, the inelastic ball and the ring follow a circular deflection path.

8 Claims, 8 Drawing Sheets

FLANGE ALIGNMENT TOOL

FIELD OF THE INVENTION

The present invention relates generally to a device for properly aligning a flange on a pipe. More specifically, the present invention is a flange alignment tool which can be clipped onto a flange and used to verify that a flange is properly aligned before welding.

BACKGROUND OF THE INVENTION

When large pipes are manufactured, flanges used for connecting and terminating pipes must be welded to the pipe by hand. For welders, the process of properly aligning the flange with respect to the pipe can be an arduous task. Not only must the flange be aligned perfectly parallel to the end face of the pipe, but the holes of the flange must be oriented properly. Often, it can be very difficult to take all of these relations into account. Moreover, the process of aligning the holes of the flange is exceedingly difficult due to the fact that no standard tools are designed to align the holes of a flange. For example, a common level is used to measure flat surfaces, not holes through a flange.

Accordingly, there is a present need for a tool which can be used to easily align the holes of a flange. The present invention is a flange alignment tool which may be used to properly align the holes of a flange, such that the flange is correctly welded to a pipe. The present invention uses a torsion spring which allows an inelastic ball to clip over one end of a hole and a ring to clip over the other end of a hole on a flange. To align a flange, this is done with two adjacent or opposing flange alignment tools and a level may be placed on top of the inelastic ball to gage if the flange is properly aligned.

DETAILED DESCRIPTION OF THE INVENTION

All illustrations of the drawings are for the purpose of describing selected versions of the present invention and are not intended to limit the scope of the present invention.

Figure 1:
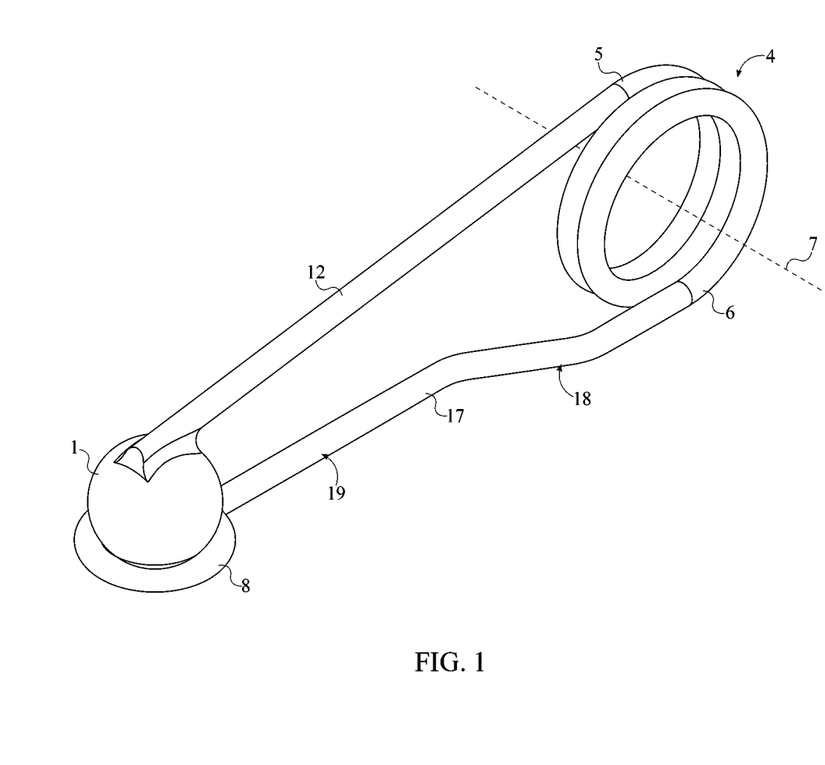
FIG. 1 is a perspective view of the present invention in a closed position.
Figure 2:
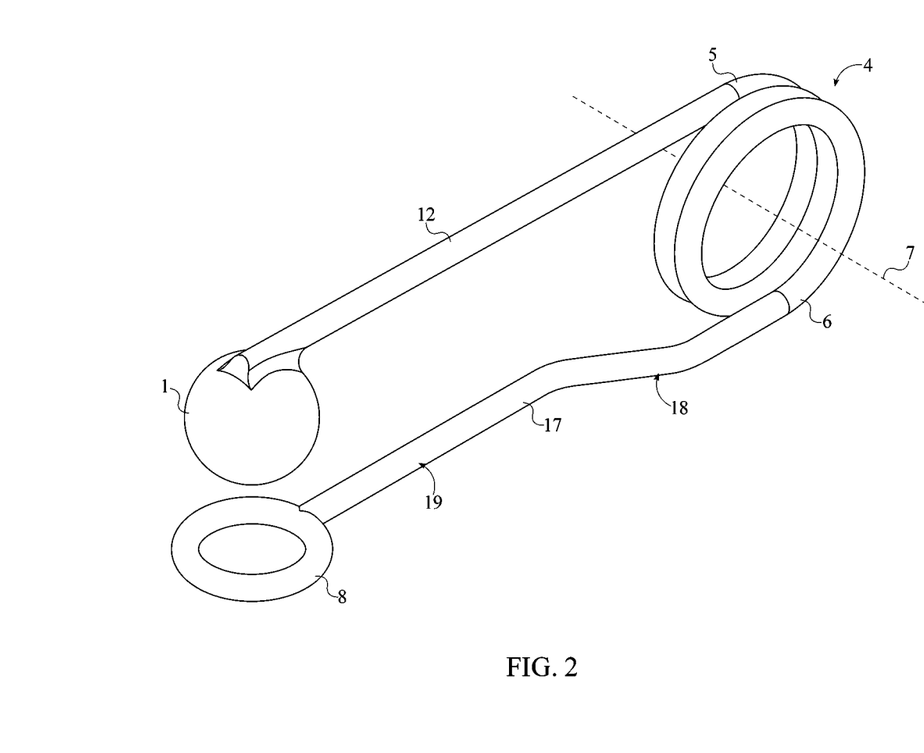
FIG. 2 is a perspective view of the present invention in an open position.

With reference to FIGS. 1-2, the present invention is a flange alignment tool that is used to properly align to flanges to pipes before welding. The present invention comprises an inelastic ball 1, a ring 8, and a torsion spring 4. The torsion spring 4 is used to constantly apply a force to push inelastic ball 1 and the ring 8 together. In the preferred embodiment of the present invention, the torsion spring 4 resembles a tightly wound coil which comprises a first load leg 5 and a second load leg 6 that are positioned at opposite ends of the torsion spring 4. In alternative embodiments of the present invention, the torsion spring 4 could be a single U-shaped piece that joins the first load leg 5 and the second load leg 6 and has spring-like characteristics. The inelastic ball 1 is mounted adjacent to the first load leg 5. The inelastic ball 1 is used to secure the present invention to a flange and is also used in determining if the flange is properly aligned. The ring 8 is mounted adjacent to the second load leg 6 and is used to align the tool about the hole in which the inelastic ball 1 is secured on the opposite side of the flange. In this configuration, the torsion spring 4 allows the present invention to clip onto the flange about a specific hole.

Figure 3:
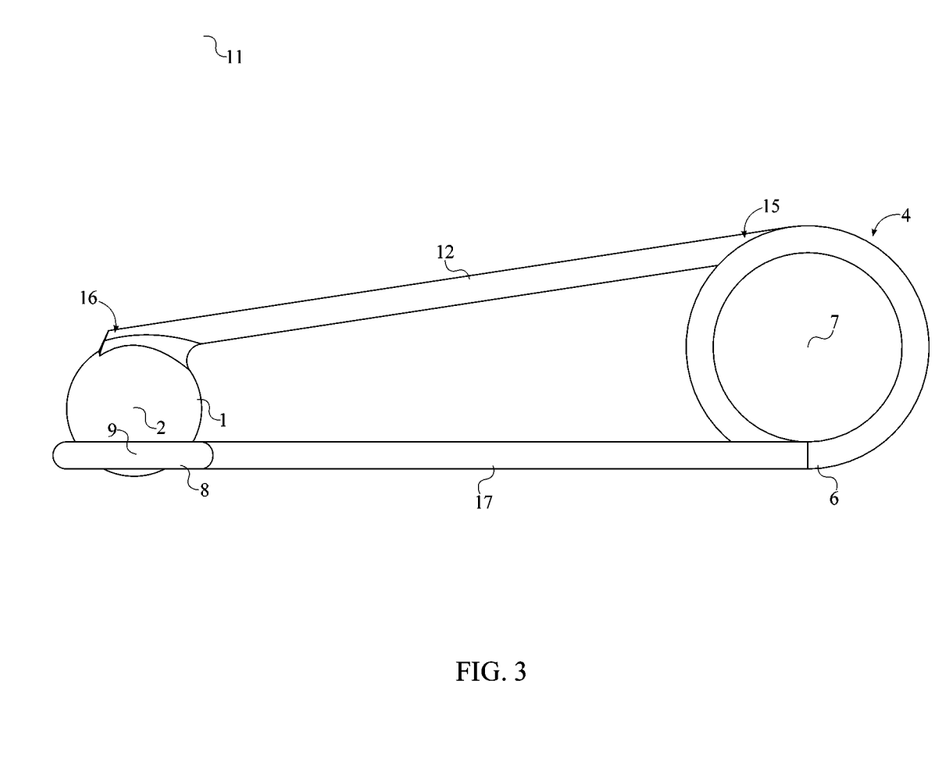
FIG. 3 is a right side present invention in the closed position.
Figure 4:
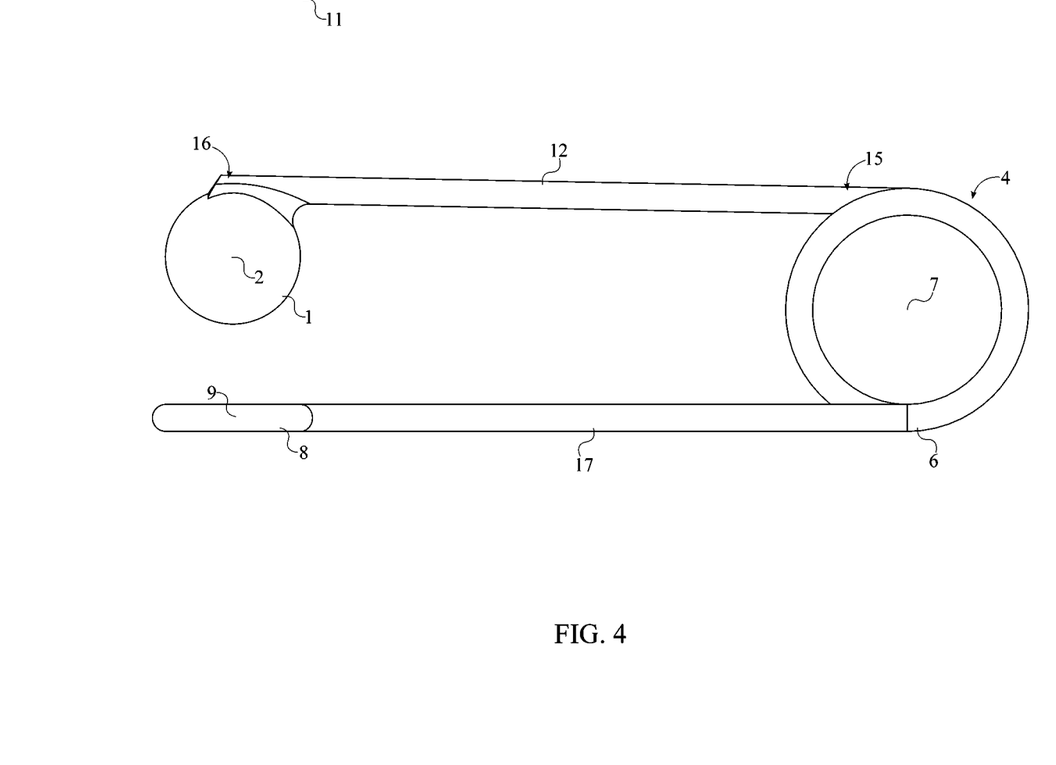
FIG. 4 is a right side present invention in the open position.

In reference to FIGS. 3-4, a circular deflection path 11 is perpendicularly oriented about a rotation axis 7 of the torsion spring 4. The circular deflection path 11 defines where the inelastic ball 1 and the ring 8 are able to move relative to the rotation axis 7 if the torsion spring 4 is flexed. When the user attempts to attach or detach the present invention from a flange, the torsion spring 4 must be flexed in order to provide enough clearance between the inelastic ball 1 and the ring 8. The first load leg 5 and the second load leg 6 are perpendicularly oriented with the rotation axis 7 such that the inelastic ball 1 and the ring 8 may align with the circular deflection path 11. A center point of the inelastic ball 2 is positioned coincident with the circular deflection path 11. A center point of the ring 9 is also positioned coincident with the circular deflection path 11. The ring 8 is perpendicularly oriented about the circular deflection path 11. This configuration insures that the ring 8 will align flush against the flange when the present invention is clipped to the flange and also allows the inelastic ball 1 and the ring 8 to align with each other when the present invention is in a closed position.

In reference to FIG. 1, the present invention also comprises a first extension arm 12. The first extension arm 12 is used to increase the distance between the torsion spring 4 and the inelastic ball 1 such that the present invention may be clipped onto a flange without interfering with the torsion spring 4. The first load leg 5 is connected adjacent to the first extension arm 12, and the inelastic ball 1 is connected adjacent to the first extension arm 12, opposite to the first load leg 5. This configuration is beneficial because the holes of the flange may be located at some distance away from the perimeter of the flange. Without the first extension arm 12, the torsion spring 4 may be positioned too close to the inelastic ball 1 for the present invention to properly fit over the flange.

Figure 7:
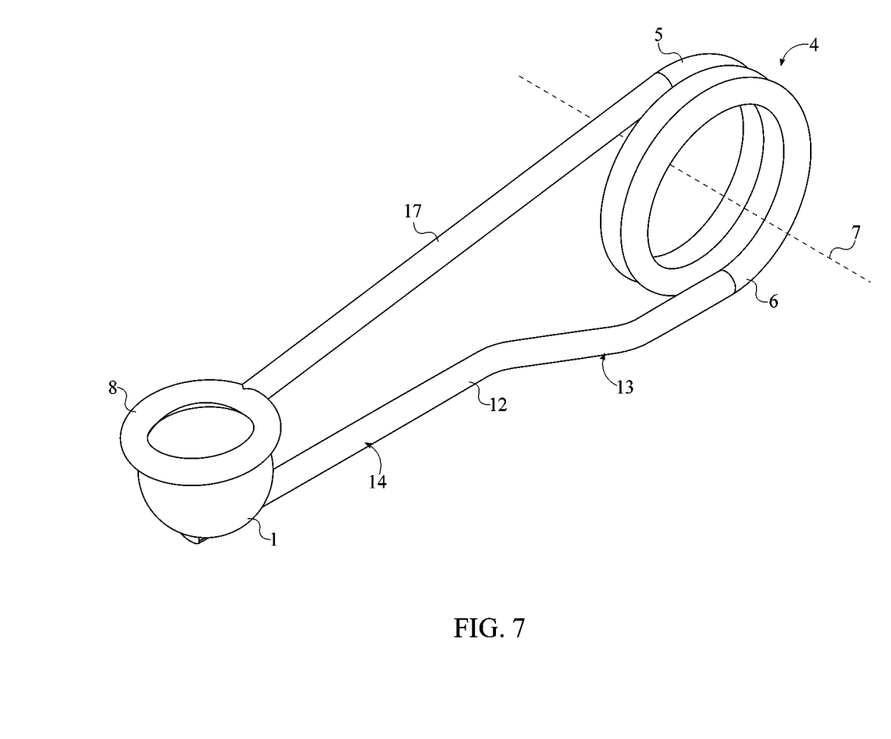
FIG. 7 is a perspective view of an alternative embodiment of the present invention, wherein the first extension arm alternatively comprises the alignment portion and the extension portion.

In one embodiment of the present invention, the first extension arm 12 comprises a first alignment portion 13 and a first extension portion 14. This is shown in FIG. 7. The first extension portion 14 is positioned parallel to the first load leg 5 and is used to increase the distance between the torsion spring 4 and the inelastic ball 1. The first extension portion 14 is positioned coplanar to the circular deflection path 11. This is possible because of the first alignment portion 13, which is connected in between the first load leg 5 and the first extension portion 14. Because each coil of the torsion spring 4 is stacked upon each other, the first load leg 5 and the second load leg 6 do not naturally align with each other. The first alignment portion 13 is used to compensate for the thickness of the torsion spring 4 such that the inelastic ball 1 and the ring 8 are ultimately aligned.

In reference to FIG. 3, the first extension arm 12 comprises a proximal end 15 and a distal end 16. The proximal end 15 is fixed to the first load leg 5. The distal end 16 is tangentially connected to the inelastic ball 1. The inelastic ball 1 is positioned in between the distal end 16 and the ring 8. This configuration allows the inelastic ball 1 to be secured to a hole in a flange without the first extension arm 12 interfering with the flange. If the first extension arm 12 were to be aligned closer to the center point of the inelastic ball 2, the first elastic arm would likely hinder the ability of the user to properly attach the present invention to a flange.

In reference to FIGS. 1-2, the present invention further comprises a second extension arm 17. The second extension arm 17 is used to increase the distance between the torsion spring 4 and the ring 8 such that the present invention may be clipped onto a flange. The second load leg 6 is connected adjacent to the second extension arm 17, and the ring 8 is connected adjacent to the second extension arm 17, opposite to the second load leg 6. This configuration is beneficial because the holes of the flange may be located at some distance away from the perimeter of the flange. Without the second extension arm 17, the torsion spring 4 may be positioned too close to the ring 8 for the present invention to properly fit over the flange.

In the preferred embodiment of the present invention, the second extension arm 17 comprises a second alignment portion 18 and a second extension portion 19. This is shown in FIGS. 1-2. The second extension portion 19 is positioned parallel to the second load leg 6 and is used to increase the distance between the torsion spring 4 and the ring 8. The second extension portion 19 is positioned coplanar to the circular deflection path 11. This is possible because of the second alignment portion 18, which is connected in between the second load leg 6 and the second extension portion 19. Because each coil of the torsion spring 4 is stacked upon each other, the first load leg 5 and the second load leg 6 do not naturally align with each other. The second alignment portion 18 is used to compensate for the thickness of the torsion spring 4 such that the inelastic ball 1 and the ring 8 are ultimately aligned.

Figure 5:
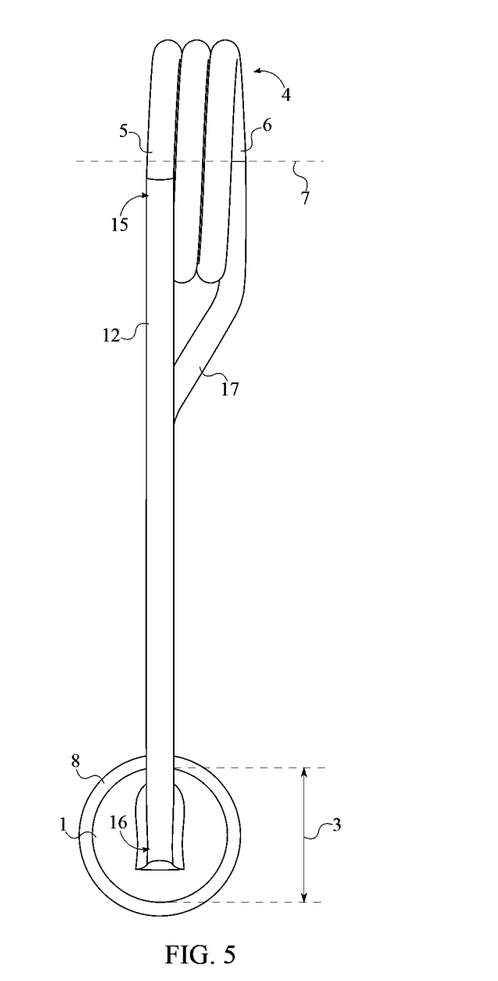
FIG. 5 is a top view of the present invention.
Figure 6:
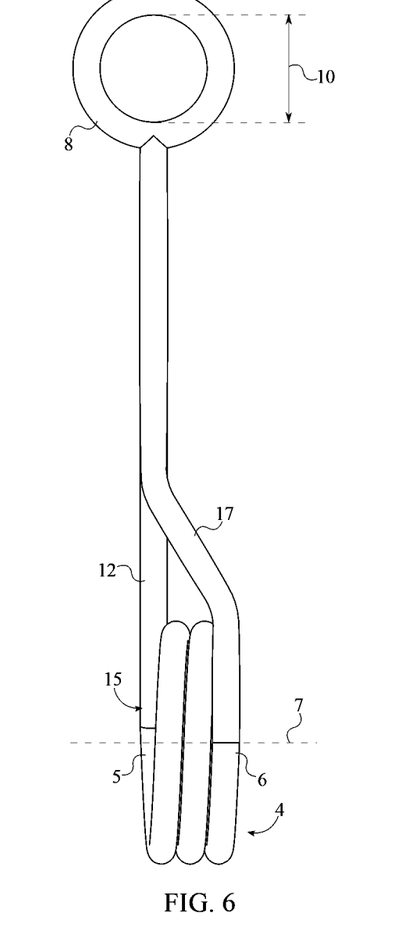
FIG. 6 is a bottom view of the present invention.

Though the present invention can be made using a number of varying dimensions, the size of the inelastic ball 1 relative to the ring 8 is important. In reference to FIGS. 5-6, the ring 8 is sized to fit around a hole in a flange that is to be aligned. A ring inner diameter 10 is designed to be greater than or equal to that of the hole such that the user may insert a bolt or measuring tool inside the hole while the present invention is secured to the flange. The inelastic ball 1 comprises a ball diameter 3 which is intended to always be larger than the size of the hole in the flange. This relationship is necessary to ensure that the inelastic ball 1 is never fully inserted into the hole. Furthermore, the ball diameter 3 must be greater than the size of the hole to allow the inelastic ball 1 to pivot about the hole. When comparing the sizes of the ring 8 and the inelastic ball 1, the ring inner diameter 10 is less than the ball diameter 3. This relationship helps to prevent the inelastic ball 1 from being fully inserted into the ring 8 and, thus, tangling the present invention.

Figure 8:
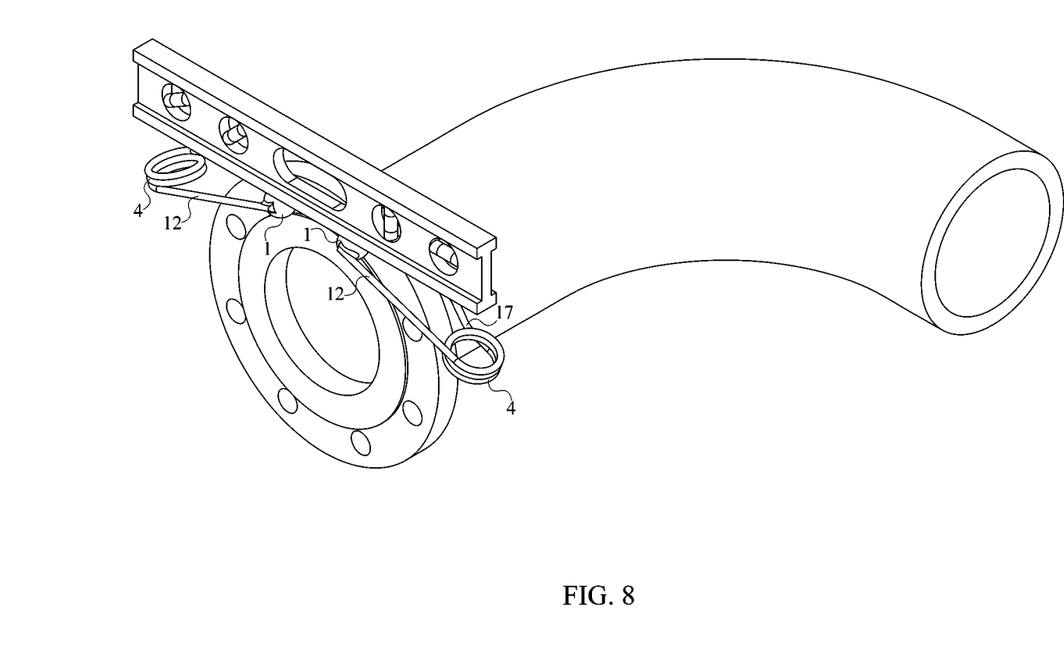
FIG. 8 is a perspective view of two flange alignment tools being used to align a flange to a pipe.

When aligning a flange to a pipe, the two flange alignment tools are used to determine if two corresponding holes are properly aligned. This process is shown in FIG. 8 and involves positioning the flange adjacent to the pipe and clipping two of the flange alignment tools to two adjacent or opposing holes. Once the flange alignment tools are secured to the flange, a level may be placed on top of each of the inelastic balls 1 and analyzed. If the flange is not properly aligned, the user may need to rotate or maneuver the flange into the correct position. Once the flange is correctly positioned, the user may weld the flange to the pipe.

Although the invention has been explained in relation to its preferred embodiment, it is to be understood that many other possible modifications and variations can be made without departing from the spirit and scope of the invention as hereinafter claimed.

What is claimed is:
1. A flange alignment tool comprises:
an inelastic ball;
a ring;
a torsion spring;
a first extension arm;
a second extension arm;
the torsion spring comprises a first load leg and a second load leg;
a circular deflection path being perpendicularly oriented about a rotation axis of the torsion spring;
the first load leg and the second load leg being perpendicularly oriented with the rotation axis;
a center point of the inelastic ball being positioned coincident with respect to the circular deflection path;
the inelastic ball being connected to the first load leg;
a center point of the ring being positioned coincident with the circular deflection path;
the ring being perpendicularly oriented about the circular deflection path;
the ring being connected to the second load leg;
the first load leg being connected adjacent to the first extension arm;
the inelastic ball being connected adjacent to the first extension arm, opposite to the first load leg;
the second load leg being connected adjacent to the second extension arm;
the ring being connected adjacent to the second extension arm, opposite to the second load leg;
the inelastic ball comprises a ball diameter;
the ring comprises a ring inner diameter; and
the ring inner diameter being less than the ball diameter.

2. The flange alignment tool as claimed in claim 1 comprises:
the first extension arm comprises a first alignment portion and a first extension portion;
the first extension portion being positioned parallel to the first load leg;
the first extension portion being positioned coplanar to the circular deflection path; and
the first alignment portion being connected in between the first load leg and the first extension portion.

3. The flange alignment tool as claimed in claim 1 comprises:
the first extension arm comprises a proximal end and a distal end;
the proximal end being fixed to the first load leg;
the distal end being tangentially connected to the inelastic ball; and
the inelastic ball being positioned in between the distal end and the ring.

4. The flange alignment tool as claimed in claim 1 comprises:
the second extension arm comprises a second alignment portion and a second extension portion;
the second extension portion being positioned parallel to the second load leg;
the second extension portion being positioned coplanar to the circular deflection path; and
the second alignment portion being connected in between the second load leg and the second extension portion.

5. A flange alignment tool comprises:
an inelastic ball;
a ring;
a torsion spring;
the torsion spring comprises a first load leg and a second load leg;
the inelastic ball comprises a ball diameter;
the ring comprises a ring inner diameter;
a circular deflection path being perpendicularly oriented about a rotation axis of the torsion spring;
the first load leg and the second load leg being perpendicularly oriented with respect to the rotation axis;
a center point of the inelastic ball being positioned coincident with the circular deflection path;
the inelastic ball being connected to the first load leg;
a center point of the ring being positioned coincident with the circular deflection path;
the ring being perpendicularly oriented about the circular deflection path;
the ring being connected to the second load leg;
the ring inner diameter being less than the ball diameter;
a first extension arm;
the first load leg being connected adjacent to the first extension arm;
the inelastic ball being connected adjacent to the first extension arm, opposite to the first load leg;
the first extension arm comprises a proximal end and a distal end;
the proximal end being fixed to the first load leg;
the distal end being tangentially connected to the inelastic ball; and
the inelastic ball being positioned in between the distal end and the ring.

6. The flange alignment tool as claimed in claim 5 comprises:
the first extension arm comprises a first alignment portion and a first extension portion;
the first extension portion being positioned parallel to the first load leg;
the first extension portion being positioned coplanar to the circular deflection path; and
the first alignment portion being connected in between the first load leg and the first extension portion.

7. The flange alignment tool as claimed in claim 5 comprises:
a second extension arm;
the second load leg being connected adjacent to the second extension arm; and
the ring being connected adjacent to the second extension arm, opposite to the second load leg.

8. The flange alignment tool as claimed in claim 7 comprises:
the second extension arm comprises a second alignment portion and a second extension portion;
the second extension portion being positioned parallel to the second load leg;
the second extension portion being positioned coplanar to the circular deflection path; and
the second alignment portion being connected in between the second load leg and the second extension portion.

\* \* \* \* \*